(12) United States Patent
Olsen et al.

(10) Patent No.: US 10,348,807 B2
(45) Date of Patent: Jul. 9, 2019

(54) MULTI-PART UPLOAD

(71) Applicant: Caringo, Inc., Austin, TX (US)

(72) Inventors: Glen Paul Olsen, Paraparaumu (NZ);
Jonathan Ring, Austin, TX (US);
Russell Turpin, Corpus Christi, TX (US)

(73) Assignee: CARINGO INC., Austin, TX (US)

( * ) Notice: Subject to any disclaimer, the term of this patent is extended or adjusted under 35 U.S.C. 154(b) by 0 days.

(21) Appl. No.: 15/661,851

(22) Filed: Jul. 27, 2017

(65) Prior Publication Data

US 2018/0034892 A1      Feb. 1, 2018

Related U.S. Application Data

(60) Provisional application No. 62/368,050, filed on Jul. 28, 2016.

(51) Int. Cl.
| | |
|---|---|
| H04L 29/08 | (2006.01) |
| H04L 29/06 | (2006.01) |
| G06F 16/13 | (2019.01) |
| G06F 16/17 | (2019.01) |
| G06F 16/14 | (2019.01) |
| G06F 16/176 | (2019.01) |
| G06F 16/18 | (2019.01) |

(52) U.S. Cl.
CPC ............ H04L 67/06 (2013.01); G06F 16/13 (2019.01); G06F 16/152 (2019.01); G06F 16/17 (2019.01); G06F 16/176 (2019.01); G06F 16/1858 (2019.01); H04L 65/4023 (2013.01); H04L 67/10 (2013.01); H04L 67/146 (2013.01); H04L 67/1097 (2013.01)

(58) Field of Classification Search
CPC ............... H04L 67/06; G06F 17/30091; G06F 17/30109; G06F 17/30129
USPC ........................................................ 709/217
See application file for complete search history.

(56) References Cited

U.S. PATENT DOCUMENTS 9,325,791 B1     4/2016  Blahaerath et al.
2007/0271313 A1*  11/2007  Mizuno ............... G06F 11/1662
(Continued)

OTHER PUBLICATIONS

International Search Report for PCT/US2017/044241, dated Nov. 7, 2017.
(Continued)

*Primary Examiner* — Nicholas R Taylor
*Assistant Examiner* — Meng Vang
(74) *Attorney, Agent, or Firm* — Beyer Law Group LLP (57) ABSTRACT

A method writes a data block from a client application onto object storage. Object storage receives a write request with a data block over an API from a coupling server, the data block being an update to a target file stored within object storage. Next, object storage receives a completion request from the coupling server for the target file. Then, object storage receives a final manifest from the coupling server, the final manifest includes for each data block of the target file an identifier for said data block, a start location, an end location or a size, and a unique identifier for the data block; the manifest has the data blocks ordered by positions in the target file. Finally, object storage assembles of new version of the target file using the final manifest, the received data block and other data blocks of the target file, and writes a new version into object storage.

20 Claims, 7 Drawing Sheets

(56) References Cited

U.S. PATENT DOCUMENTS

| | | | | |
|---|---|---|---|---|
| 2012/0066337 A1* | 3/2012 | Wu | ................ | G06F 3/0605 |
| | | | | 709/214 |
| 2013/0339818 A1* | 12/2013 | Baker | ................ | G06F 11/10 |
| | | | | 714/763 |
| 2014/0059315 A1* | 2/2014 | Iwashita | ................ | G06F 3/0619 |
| | | | | 711/162 |
| 2014/0229455 A1 | 8/2014 | Bestler et al. | | |
| 2014/0368945 A1* | 12/2014 | Blount | ................ | G06F 3/0674 |
| | | | | 360/48 |
| 2015/0112935 A1* | 4/2015 | French | ................ | H04L 67/06 |
| | | | | 709/219 |
| 2015/0350316 A1 | 12/2015 | Calder et al. | | |
| 2016/0057229 A1* | 2/2016 | Barton | ................ | G06F 17/30088 |
| | | | | 707/639 |
| 2016/0170657 A1 | 6/2016 | Suehr et al. | | |

OTHER PUBLICATIONS

Written Opinion of the International Searching Authority for PCT/US2017/044241, dated Nov. 7, 2017.

\* cited by examiner

White File Data
FIG. 3

Read File Data

```
{
    "parts": [
        {
            "partNumber": 11,
            "uuid": "bbaa8eaaf9f1575acee76573d3f85bd9"
        },
        {
            "partNumber": 8,
            "uuid": "234ef7d01a9a7b817e5f38615064507c"
        },
        {
            "partNumber": 3,
            "uuid": "593358bd04b69c2ec6c7b6a9980d64c3"
        },
        {
            "partNumber": 7,
            "uuid": "18077e9b3feed4e39d19593e6f0113d7"
        },
        {
            "partNumber": 4,
            "uuid": "c5a17951c655421b8d45bfb75e4a9565"
        },
        {
            "partNumber": 10,
            "uuid": "ccc2c4cac06ba460274396ecff185e83"
        },
        {
            "partNumber": 6,
            "uuid": "fadfef1eeacf57b54a2a04fcddc4a6a7"
        },
        {
            "partNumber": 5,
            "uuid": "de468a822ff523be31b562dad1f194ed"
        },
        {
            "partNumber": 9,
            "uuid": "daa00e3d576940b41749ba982c89608c"
        },
        {
            "partNumber": 1,
            "uuid": "2b3c17c6ce4cef21383fb9ad3259e7ed"
        },
        {
            "partNumber": 15,
```

MULTI-PART UPLOAD

CROSS-REFERENCE TO RELATED APPLICATIONS

This application claims priority of U.S. Provisional Patent Application No. 62/368,050, filed Jul. 28, 2016, entitled "Multi-Part Upload," which is hereby incorporated by reference. This application is related to U.S. Patent Application No. 62/368,048 filed on the same date, entitled "Mounting Dynamic Endpoints," which is hereby incorporated by reference.

FIELD OF THE INVENTION

The present invention relates generally to storing digital objects in parts in object storage. More specifically, the present invention relates to parallel upload or download of object parts.

BACKGROUND OF THE INVENTION

Some existing storage systems provide access to data storage through a REST interface via a coupling that presents a file system interface for managing, storing, updating and retrieving objects, data and metadata. There are a variety of systems that provide such an interface, these include the Content File System (CFS) from Caringo, File Connectors from Scality and Coronado Access Points from Bridgestor.

The file system side of these couplings uses traditional file system protocols such as NFS (Network File System), Server Message Block (SMB)/Common Internet File System (CIFS) and File Transfer Protocol (FTP) through file system drivers, or through other mechanisms that provide a file system interface to a client computer.

These existing storage systems are not optimal in that they must first either cache or stage data being read from or being written to the object storage; the caching or staging occurs via locally-accessible traditional block or NAS storage and is handled by the coupling server. On a client application read using a file system protocol, the coupling server must first retrieve a complete copy of the requested file or object data from the object storage; once a copy of the data has been successfully created on locally-accessible block storage, the coupling server then reads the data from locally-accessible storage and returns the requested data to the client application over the file system protocol. On open, read or write, the coupling server must first retrieve the file data from the object storage and then cache or stage the data on locally-accessible block or NAS storage. It can only then implement the original file system protocol requested action received from the client application by reading or updating the local cached or staged copy. After the client application has finished writing to the coupling server the coupling server must then transfer the locally-modified cached data to the object storage.

This requirement for caching or staging of data introduces latency and the risk of losing data if the coupling server itself or if the coupling server's locally-accessible cache or stage storage fails, or otherwise becomes unavailable before the data can be transferred to the object storage. Even storage systems that implement file or data manifests introduce similar latency and risk because the manifest may be unavailable corrupted or lost.

Therefore, improved systems and techniques are desired that address the above and other deficiencies in storage systems.

SUMMARY OF THE INVENTION

To achieve the foregoing, and in accordance with the purpose of the present invention, method and apparatus are disclosed that allows files to be uploaded in multiple parts, without regard to the order of uploading, without needing to cache or stage files or blocks of data on a local permanent storage, without needing to read and process a manifest upon read or write, and that allows a single part of a file in object storage to be updated.

In a first embodiment, a method writes file data from a client application onto object storage. A first step receives, at a coupling server on a computer via a file system protocol, a write request from a client application that includes a data block, a start location, one of an end location or a size, and a target file name. Next, a step creates a temporary manifest on the computer for said writing that includes an identifier for said data block, the start location, the end location or a size, and a unique identifier for the data block. A next step retains the data block in a memory of the computer without storing the data block on locally-accessible storage of said computer. Finally, a step uploads the data block over an API to the object storage and includes the identifier for the object part, the start location, the end location or a size, and the unique identifier for the data block.

In a second embodiment, a method writes a data block from a client application onto object storage. A first step receives, at a coupling server on a computer via a file system protocol, a write request from a client application that includes a data block of a target file. Next, a step creates a temporary manifest on the computer that includes an identifier for the data block, a start location, an end location or a size, and a unique identifier for the data block. A next step uploads the data block over an API to the object storage and includes the identifier for the object part, the start location, the end location or a size, and the unique identifier for the data block. Then, a step receives a file close request from and client application and creates a final manifest that includes a list of all data blocks of the target file in the correct order. Finally, a step sends the final manifest from the coupling server to the object storage; thus the object storage creates a new version of the target file using the final manifest and stores the new version in object storage.

In a third embodiment, a method writes a data block from a client application onto object storage. A first step receives a write request with a data block over an API at object storage from a coupling server, the data block being an update to a target file stored within object storage. Next, a step receives a completion request at object storage from the coupling server for the target file. Then, a step receives a final manifest at object storage from the coupling server, the final manifest includes for each data block of the target file an identifier for said data block, a start location, an end location or a size, and a unique identifier for the data block; the manifest has the data blocks ordered by positions in the target file. Finally, a step assembles of new version of said target file by said object storage using said final manifest, said received data block and other data blocks of said target file, and writing said new version into said object storage.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Many data storage systems use a REST interface, i.e., one that is compliant with HTTP (RFCs 2616, 7230, 7231, 7232, 7233, 7234, 7235, 7236 and 7237). These interfaces provide the ability to store, retrieve and manage both objects and metadata in the form of HTTP headers and their values. Examples of such interfaces include Amazon's S3 services, Openstack Swift and Caringo SCSP.

As mentioned above, in one storage system technique, a coupling server splits the file data into fixed or variable-sized blocks of data; these blocks are then stored as individual objects in the object storage along with a manifest of object names or object identifiers that describe the correct order in which to read these individual objects so as to return correctly ordered file data when requested. When an update is made, only the changed data blocks are stored as new individual objects in the object storage along with a new or updated manifest to reflect the identifiers of the updated objects. Using this method, the manifest must always be read and processed before any data can be returned on a read (or updated on a write). This required reading of the manifest again introduces latency and risk if the manifest is unavailable, corrupted or lost. If unavailable, corrupted or lost, the data cannot be read or updated in that the list and order of individual object identifiers required to fulfill the request is not available and cannot be referenced. Lastly, when this prior method is utilized, file data is no longer stored as a single object, instead the blocks of data written are stored themselves as unrelated individual objects in the Object Store. Thus, the manifest must always be referenced by the client or client application, which must then itself read the required data from the individual objects; that is, an object can no longer be treated as a single continuous object, instead it is now many separate objects that must be read in the correct order.

It is thus realized that object storage requires a individual objects data (or parts of the data) to be sent in sequential order from the first data byte to the final data byte, and that object storage does not allow data for an single object to be written out of byte order. Current object storage also requires a whole new object version to be created even if only one byte of data is to be updated; it is not possible to update only part of the data in an existing object.

The present invention allows traditional file system protocols to be utilized in order to stream file data in any byte order sequence directly between the client application and the object storage; this removes the requirement for data written by a client application to first be staged or cached in temporary block or NAS storage, before finally being written as a complete new object version to the object storage (and removes the requirement for staging or caching for data being read). The present invention also utilizes parallel uploading and downloading as described below as a method of allowing file data to be streamed in any byte order directly to and from object storage.

"Object storage" is used here in reference to stored data accessible through a REST interface, for both original data and metadata that may be defined when the data is stored, or later modified. The term is agnostic to the ultimate persisted format, i.e., object storage includes storage systems that ultimately persist data as files, as blocks, or as objects. It also is agnostic with regard to the computer server architecture used for object storage, which may be clustered or not, and if clustered, may be symmetric or layered or organized as a ring, or some combination. An "object store" refers to one or a set of computer servers providing object storage.

Temporary Part Order Manifest

Figure 1:
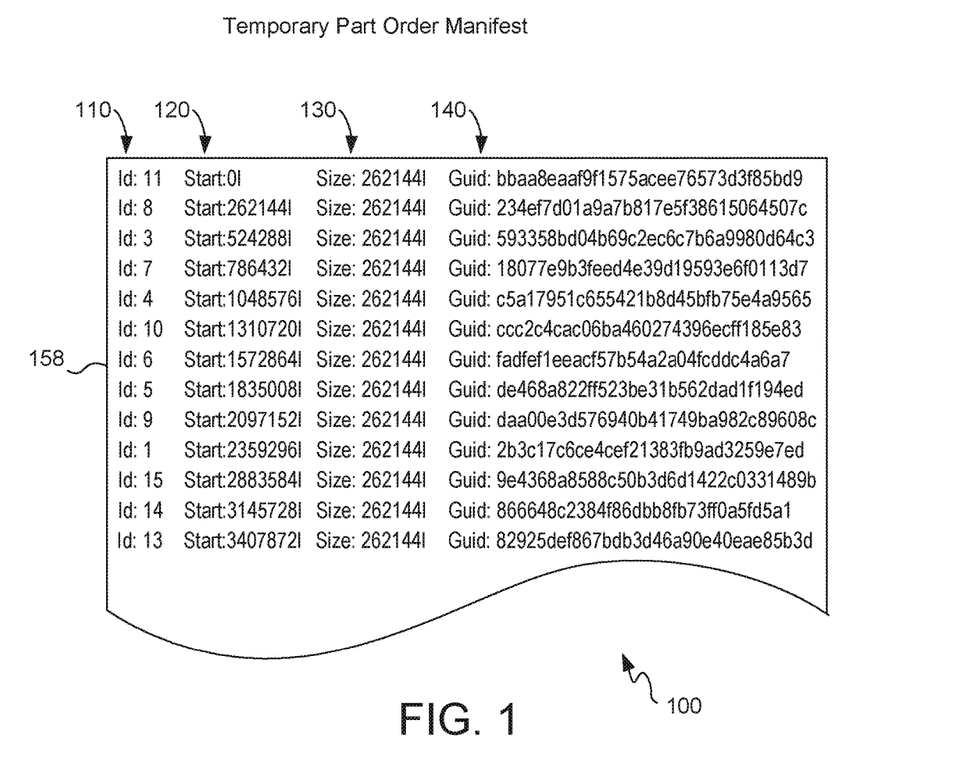
FIG. 1 shows a temporary part order manifest.

FIG. 1 shows a temporary part order manifest 100 and its use will be described in greater detail below. When data blocks of any length are received from a client application over a traditional file system protocol a process on the coupling server creates parallel upload object parts which contain the data received. These object parts may be temporary or may later become permanent objects and are stored within the object storage.

While the parallel upload session is active the process keeps a list of all parallel upload object parts that have been created; this list is described in the temporary part order manifest. The temporary part order manifest may be stored in RAM, in flash memory, on a solid-state drive, in a traditional block on the coupling server or within the object storage, and may be stored as a file, object or other data structure such as a b-tree or in a relational database. After completion of the parallel upload session the temporary part order manifest is discarded as it is no longer required. Parallel upload session completion occurs after the client application has indicated that it has finished writing the file data (for example, by issuing a file close), the coupling server has successfully uploaded all data to the object store, requested the object storage to complete the parallel upload, and the object storage has acknowledged back to the coupling server that the parallel upload has completed.

The contents of the temporary part order manifest 100 identify one object part per row and include: the part identifier 110, the start position offset (byte start location) of the data 120, the size of the part 130 and the identifier of the object part 140. In addition to or instead of size 130, the ending position offset of the data may be included. The identifier 140 may be a GUID (Globally Unique Identifier) or other unique identifier such as opaque object names. The rows of the temporary part order manifest may be stored in any order, for example, ordered by the start position offset of the data 120 or by the part identifier 110; there is no requirement that the contents of the temporary part order manifest be ordered in any particular way.

Parallel uploading (also known as multi-part uploading) is a call to a REST interface or other API that enables the upload of objects in parts to object storage. Parallel uploading is a three-step process: 1) initiate the upload, 2) upload the object parts, and after uploading all the parts, 3) complete the parallel upload. Upon receiving the complete parallel upload request, the object storage constructs the object from the uploaded parts and stores it; one may then access the object as one would any other object in the object storage.

The present invention uses parallel uploading to store byte ranges sent over traditional file system protocols (such as NFS, SMB, CIFS, FTP, etc.) without the requirement for staging or caching the received data; these byte ranges can be received in any order from the client application. Byte ranges received are stored as parallel upload object parts directly within the object store and a list of these parts are stored in a temporary part order manifest. If a read request is made by the client and data is requested that has previously been written during the current parallel upload session, then any data stored in the parallel upload object parts is returned to the client; if data is requested that was previously written to the object storage (through any object storage supported method, parallel upload or other) but has not been changed in the current parallel upload session, then the requested data is returned using the previous data in the object storage. Upon receiving a "file close" or "file synchronization" command from the client, a parallel upload completion request is made to the object storage, resulting in a new object version being created by the object storage. This new version of the object then replaces the previous current version of the object to become the active current object version, that is, from that time on, the object storage will return data from the new current version for any read request while that version is still the current version.

System Diagram

Figure 2:
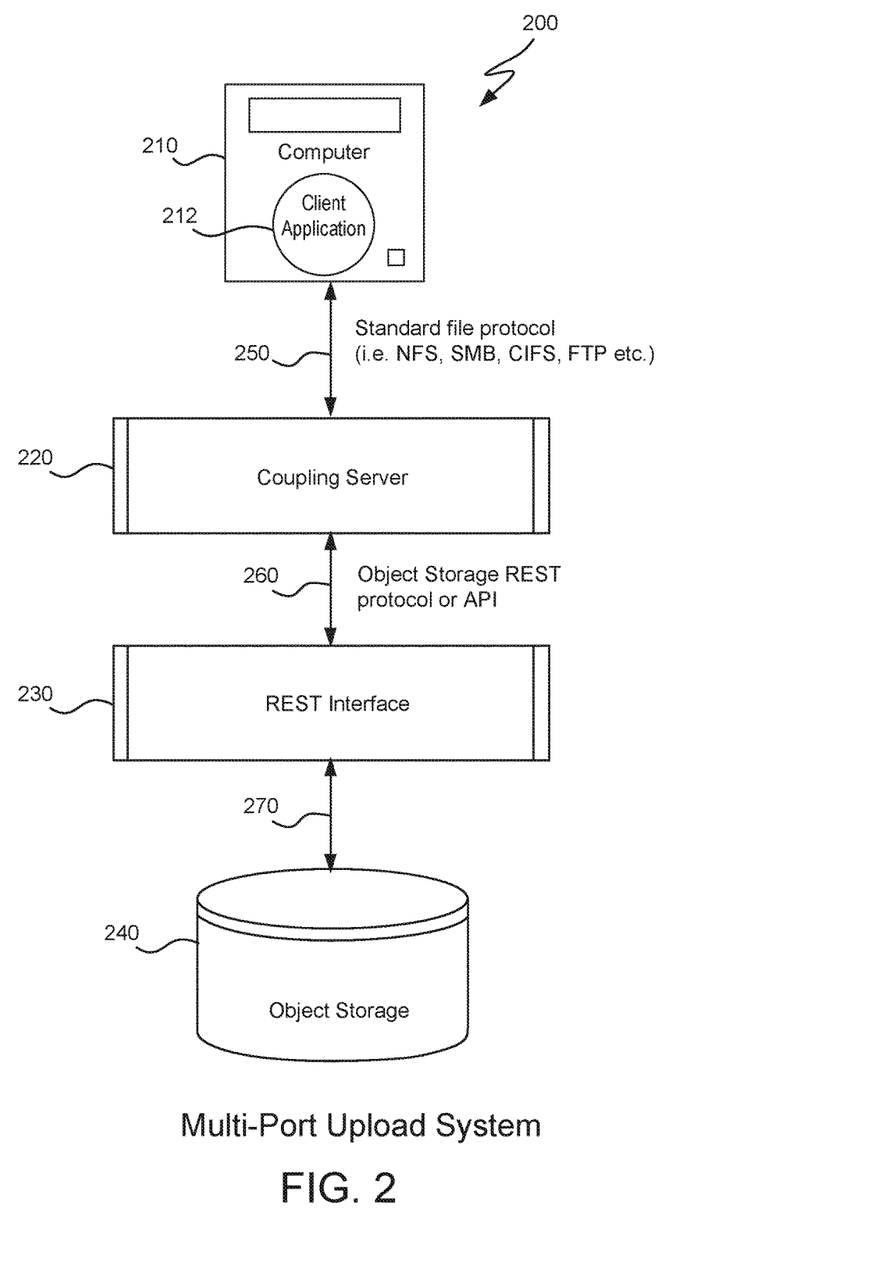
FIG. 2 is a block diagram of a multi-part upload system.

FIG. 2 is a block diagram of a multi-part upload system 200. Included are a computer 210, a coupling server 220, a REST interface 230 and object storage 240. Computer 210 may be any suitable computer executing a client application 212 such as an enterprise server computer, personal or business desktop or laptop computer, or a mobile device such as a telephone or tablet. Client application 212 is any suitable application able to issue file system commands including applications such as Linux mount, Linux shells such as bash, Windows drive mapping, Windows Explorer, Mac OS finder, or applications such as media streamers, document management systems and archiving applications Coupling server 220 is any suitable server software able to execute the processes described below; server 220 may execute upon any suitable computer, including computer 210, and may be written in programming languages such as C, C#, C++, Objective-C, Swift, Python, GO, Java, javascript, PHP and Perl.

REST interface 230 is an Application Programming Interface (API) presented by the Object Storage system to object storage client applications in order to create, read, modify and manage data objects. REST is a common form of an API, but other APIs do exist such a SOAP, which may also be used. Object storage 240 is any suitable object storage system existing upon suitable computer hardware such as hard drives, solid-state disks, flash storage, etc., and may include an object storage system such as Caringo Swarm, Amazon S3, DDN, HDS, Openstack Swift, IBM Cloud Object Storage and Scality.

In operation, client application 212 communicates using a standard file system protocol 250 (such as NFS, SMB, CIFS, FTP, etc.) with coupling server 220. Coupling server 220, in turn, then communicates with the object storage using a REST interface over a network protocol such as HTTP or other suitable object-storage-offered API 230. The REST interface then communicates with object storage 240 using any internal object storage protocol 270. REST is a common form of a API, but others do exist such a SOAP. Protocol 260 is the network protocol used by the coupling server to connect to the object storage REST interface; the most common network protocol used is HTTP.

Available to the client application 212 or user is a file system, with the traditional hierarchical namespace and the standard operations to open or delete a file that already exists, to create a new file that does not yet exist, to list a subset of files, and to read data from or to write data to an opened file. The embodiments described below describe implementations of these file system operations on an object store using techniques of the present invention.

The coupling server is capable of storing logical predicates, and maintains a list of open files by name or file describer, each with associated file properties, and each with an associated object name or identifier in the storage cluster, and the object's metadata. The coupling server also keeps a list of all active parallel write sessions (the coupling server typically does not need to keep a note of read sessions as reads are always single transactions) along with their temporary part order manifests. The coupling server receives a read request (for example) from a client application over a traditional file system protocol (such as NFS, SMB, CIFS, FTP, etc.) and translates the request into the required object storage REST protocol or API call. The coupling server then translates information and data retrieved from the object storage back into the client's file system protocol and returns the data back to the client application. Advantageously, the coupling server uses parallel uploads to store file bytes received over a traditional file system protocol in any order as described below, or to read file bytes as described below.

Flow Diagrams

Figure 3:
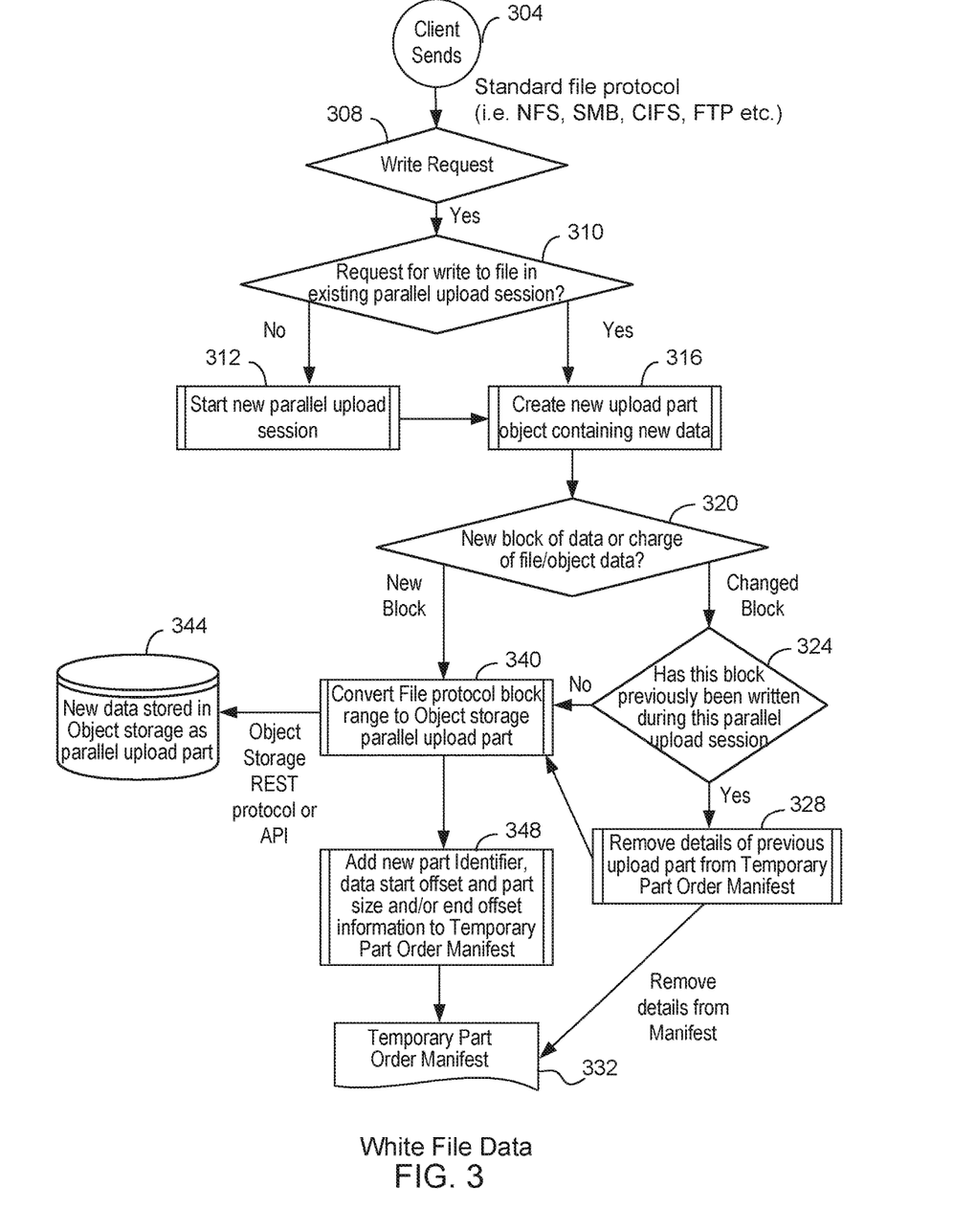
FIG. 3 is a flow diagram describing one embodiment by which data is written from a client application to object storage.

FIG. 3 is a flow diagram describing one embodiment by which data is written from a client application to object storage 240. In a first step 304, client application 212 sends a write request with a block or blocks of actual data using a standard file system protocol to the coupling server 220 to be written to a particular file.

Next, in step 308 the request is received by the coupling server and is found to be a request to write data to the particular file. In step 310 the coupling server (using open file descriptors) determines whether or not this is a write request in an existing parallel upload session.

If the client is not already actively writing to the file requested, then in step 312 a new object storage parallel upload session is initiated by the coupling server using the object storage REST or other API, at which time the coupling server also creates a new Temporary Part Order Manifest for the parallel upload session.

On the other hand, if in step 310 it is determined that an existing parallel upload session for the same client and file is active (or once the new parallel upload session has been initiated in step 312), then in step 316 a new upload part object for the received block of data is created in step 316. In other words, a new object part is created corresponding to the block of data and this new object part will have the metadata shown in FIG. 1, including an identifier, a start, size (optionally an end), and a unique identifier, as well as all of the data in the write request. A new object part is created in this way and will include all of the data in the write request.

Next, in step 320 a check is made to see if the received block (or blocks of data) is a new block (or blocks) of data for a byte range that has never been written to the file before (that is, the data is being appended to the end of the file), or if this new block is to be written to a byte range that has previously been written to the file before (the data is not being appended to the file).

If this byte range had been written previously to the file, then in step 324 a check is made by checking for a matching offset and range in the Temporary Part Order Manifest to see if that write had occurred during the current parallel upload session.

If it is determined in step 324 (by looking for existing entries covering the same, part, or overlapping byte range in the Temporary Part Order Manifest) that this byte range had previously been written to the file during the existing upload session, then in step 328 the previously written object part metadata (corresponding to the byte range) is removed from the temporary part order manifest. In other words, the particular row corresponding to the previously written object part is removed from the temporary manifest. This changed manifest 332 then remains in storage on the coupling server. Control then moves to step 340.

On the other hand, if it is determined in step 324 that this byte range had not been previously written, or if in step 320 is determined that this is a new block of data, then in step 340 the data block sent by the client application is queued by the coupling sever as a new required parallel upload object part to be uploaded.

Next, in step 344 the byte data block from step 340 is stored as a new parallel object part in object storage 240 using the REST protocol or API 260. In addition, in step 348 the GUID identifier 110 of the new object part created in step 340 is stored in the temporary part order manifest 332 along with the byte location information needed to correctly map where that piece of data is located in the final object (when created). This GUID is returned by the object storage in response to the coupling server's part creation request.

Preferably, the object store issues all GUIDs. When a new parallel object part is created by the object store, the coupling server only sends the data with the new part request; the coupling server does not provide a GUID or other name for the new part, it is the object store's responsibility to generate a unique GUID for the part when it creates the part object and return this to the coupling server. (As will be described in greater detail below, FIG. 5 will occur after FIG. 3 in order to convert the object parts into a single new object.)

In other words, a row in manifest 332 is created for the new part object. This row is created so that all data of an object can be correctly sequentially aligned on completion of the parallel upload session or if a client request is made to read this (or part of this) data byte range before the parallel upload session has been completed. Of course, multiple data blocks may be written using the above flow diagram if a new file (or part of a file) is to be stored in object storage. Once a parallel upload session has completed, if it is required the object storage maintains its own manifest internally generated by the object storage on parallel upload completion; thus, the coupling server no longer requires the temporary part order manifest and as such it is discarded by the coupling server.

Figure 5:
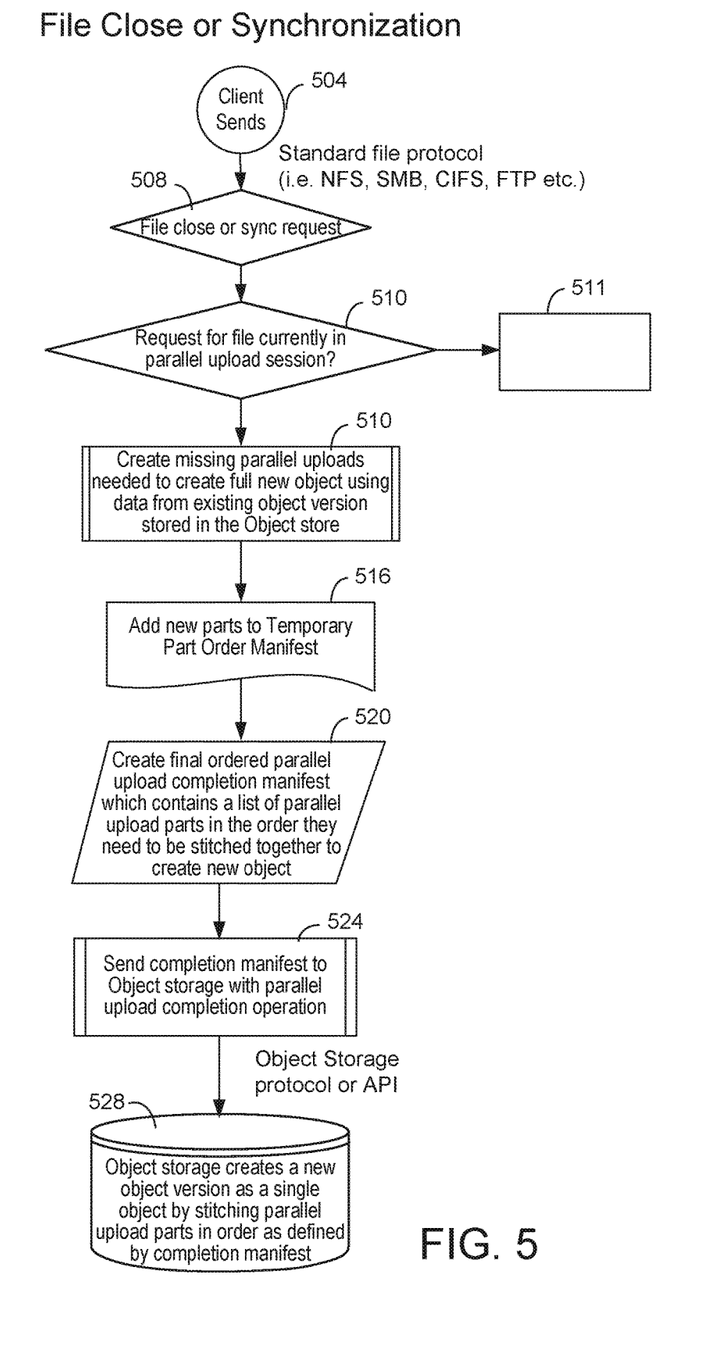
FIG. 5 is a flow diagram describing one embodiment by which a file close request or a file synchronization request is made by a client application.

If a new data block is being written to a file (or perhaps an update of a block), the object storage know where to put that block in the file in object storage because it uses the final manifest generated in 520 and sent to the object store in step 524.

Figure 4:
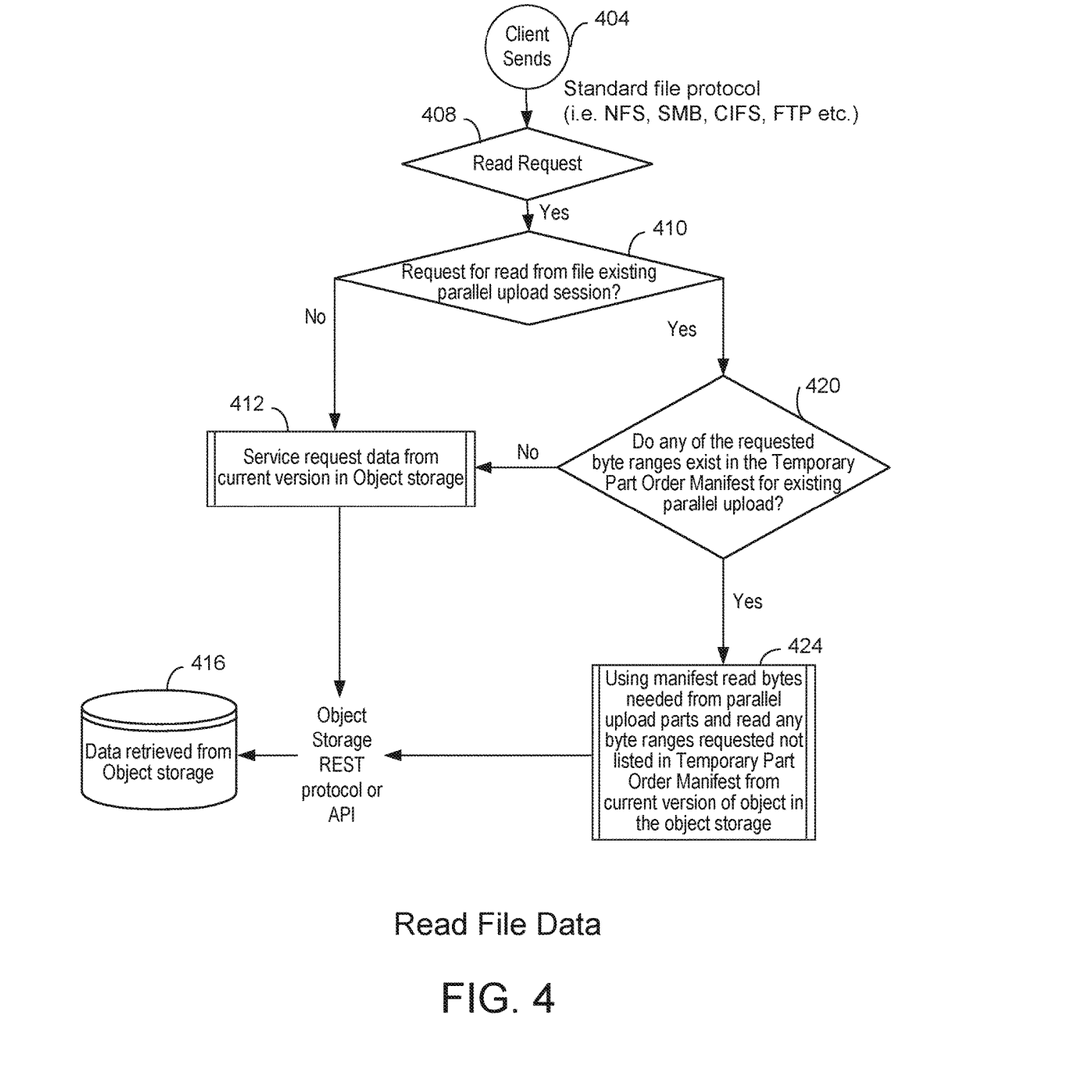
FIG. 4 is a flow diagram describing one embodiment by which data is read from object storage to a client application.

FIG. 4 is a flow diagram describing one embodiment by which data is read from object storage 240 by a client application 212. In this example, we are looking to see if an upload session for a particular file is in progress. If more data is to be read then the client may issue a new and separate read operation as a single client operation. During a given session the client may be writing to and reading from the same file. Even so, writes and reads may be dealt with as separate and distinct client operations.

In a first step 404, client application 212 sends a read request for a block or blocks of data to be read from a particular file to the coupling server 220 using a standard file system protocol. The read request includes data byte ranges to be read (data blocks).

Next, in step 408 the request is received by the coupling server and is found to be a request to read data from the particular file. In step 410 the coupling server determines whether or not this is a read request from a file in an existing parallel upload session; this is achieved by reading any temporary part manifest that the coupling server may be currently maintaining (as in FIG. 3) for the file to be read from. In this case although reading, we are looking to see if an upload session for the file is in progress. (There are no "download sessions" as all reads are single client operations; if more data is to be read then the client issues a new and separate read operation.)

If, in step 410, the client does have an existing parallel upload session for the file, then in step 420 it is determined whether or not any of the requested byte ranges in the read request exist in the temporary part order manifest for the existing parallel upload session. This determination is made via the coupling server; the coupling server maintains a list of all current parallel uploads by file and their associated temporary part order manifests. Byte ranges do not need to match any GUID range entry in the manifest exactly; the ranges may be smaller or may exceed (overlap) any range stored in the manifest. The coupling server will use the information in a file's temporary part manifest to service the complete and correct byte ranges from the object storage; this may require ranges to be read from one or more part objects. During a given session a client is likely writing to and reading from the same file, but writes and reads are still dealt with as separate distinct client operations.

If none of the bytes in the read request have been written during the existing parallel upload session (that is, no matching byte ranges are found in a temporary part upload manifest for the file being read), or if there is no existing parallel upload session in progress (as determined in step 410), then in step 412 the read request is serviced from the current version in object storage 240. Typically, object storage systems make an object the current version only after a successful data write to that object has completed, at which time the previous object version is no longer the current or active version. Accordingly, in step 416, the requested data is read from the current version in object storage 240 using the REST protocol or a suitable API. This functionality is provided by the object storage as part of its REST protocol or API for data range reads (if required) to only return the data requested and not the entire object data; for example, the HTTP bytes header is commonly used for this purpose Returning to step 420, if any of the requested byte ranges do exist in the current temporary part order manifest (i.e., if any of the requested data has been written during the existing parallel upload session for the file), then in step 424 a lookup is made in the temporary part order manifest. (Step 410 has checked if the data had been written during a existing parallel upload session or not). The lookup is performed by the coupling server. In other words, the byte range of the data requested is compared to the start 120 and size 130 of byte ranges in the rows in the temporary part order manifest. Any matching object parts in the temporary part order manifest that match with the byte range of the data requested are read by the coupling server from object storage using its REST protocol or API in step 416 and returned to the client application. In addition, any other data byte ranges that have been requested but that are not listed in the manifest are read from the current version of the object in object storage. These reads are performed over the REST protocol or a suitable API from object storage 240 as described above.

It is possible that a range may not be in the manifest, even though it had been written earlier. For example, if the client application is updating an existing object then it may want to read data from the current version of the object, in which case it has not yet rewritten or updated that range of data. It is also possible that a client may not overwrite all data in an existing object; it may only want to change some of the data in the current object version. Where the data has not been updated (or when a parallel upload session is not in progress) then the range will not exist in a manifest; when a range is not in the manifest the coupling server defaults to reading data from the current object version in the object storage.

FIG. 5 is a flow diagram describing one embodiment by which a file close request or a file synchronization request is made by a client application 212. In a first step 504, client application 212 sends a request using a standard file system protocol to the coupling server 220 to close a particular file handle or descriptor or to flush data from a particular file handle or descriptor to storage (a "sync" or "fsync" request). The request includes a file handle or descriptor. Preferably, FIG. 5 does not have to occur after each write of FIG. 3, and it never is needed as part of a read (FIG. 4). A client application may do an unlimited number of writes (FIG. 3) first; FIG. 5 occurs once the client has finished writing and issues a close 504 or at any time the client sends an fsync 504.

Next, in step 508 the request is received by the coupling server and is determined to be a request to close the file or to synchronize the file to final storage. In step 510 the coupling server determines whether or not this is a request of a file in an existing parallel upload session. In order to make this determination, the coupling server keeps track of all of its current parallel upload session by file handle or descriptor. If this request is not part of an existing session, then in step 511 the coupling server returns an error to the client application. This request may occur after the entire file has been written or may occur after only a portion has been written; the client application decides when to issue the request. Either may occur; the client application decides when to issue the request.

If, in step 510, the close or synchronization request is for a file that is part of an active parallel upload session, then in step 512 any object parts that are needed to create the complete and full new object that have not been written yet during the existing parallel upload session are now read from the current object version in object storage. The coupling server determines which data parts are missing by analyzing the temporary part manifest looking for gaps in the listed GUID byte ranges. The coupling server 220 will create these object parts using the existing data in the object storage; it may read and then transfer the required data from the object storage itself or instruct the object storage of what data ranges to take from the existing object to create each missing part. The coupling server does not need to concern itself about which is the current version; the object storage system will do this automatically.

Advantageously, the client application does not need to read the object (file) from object storage in order to write the file; but, the coupling server will do this if needed on behalf of the client. The coupling server may read the unchanged data from the existing version in the object storage and write it back, depending upon the object storage system being used. For example, Caringo Swarm object storage has functionality that the coupling server calls on to pass this data read onto the Swarm object storage to preform, but not all object storage systems have such functionality. If not, the coupling server will need to read and resend that data, but even in that case the client is not aware that the coupling server is doing such on its behalf, and as such, the client application need not be concerned with the reading of the data, nor have functionality to do so.

It is possible to read object parts from object storage if these parts have not been written yet. In this case, an existing object is being updated, in which case the current version of the object will already contain the data which was written through a previous parallel upload session. And, it is possible to read object parts from object storage even if these parts have not been written in the current session. This is in the case that an existing object is being updated, in which case the current version of the object will already contain the data which had been written through a previous parallel upload session.

Next, in step 516, the GUID with start range and range size (or end) for each of these object parts that have just been created using data from the current object version is stored in the temporary part order manifest; the GUID is returned by the object storage system to the coupling server when the parts have been created. For example, if the object part having the unique identifier (GUID) shown in row 158 of FIG. 1 is read from object storage in step 512, then in step 516 this row 158 of object part metadata will be written to the manifest.

Once these missing object parts have been added to the manifest, then in step 520 a final parallel upload completion manifest is created from the temporary part order manifest. This final manifest lists all object parts in the correct order required in order to stitch them together to form the complete new object version.

In step 524 the coupling server sends the final parallel upload completion manifest to object storage 240 along with a parallel completion operation using the object storage REST protocol or a suitable API command "complete parallel upload operation."

Finally, in step 528 object storage 240 creates a new object version corresponding to the final manifest that contains all of the data stored in the correct ascending byte order as listed in the final manifest. The object storage system will then automatically handle all management of prior object versions, new object version, identification, etc.

Figure 6:
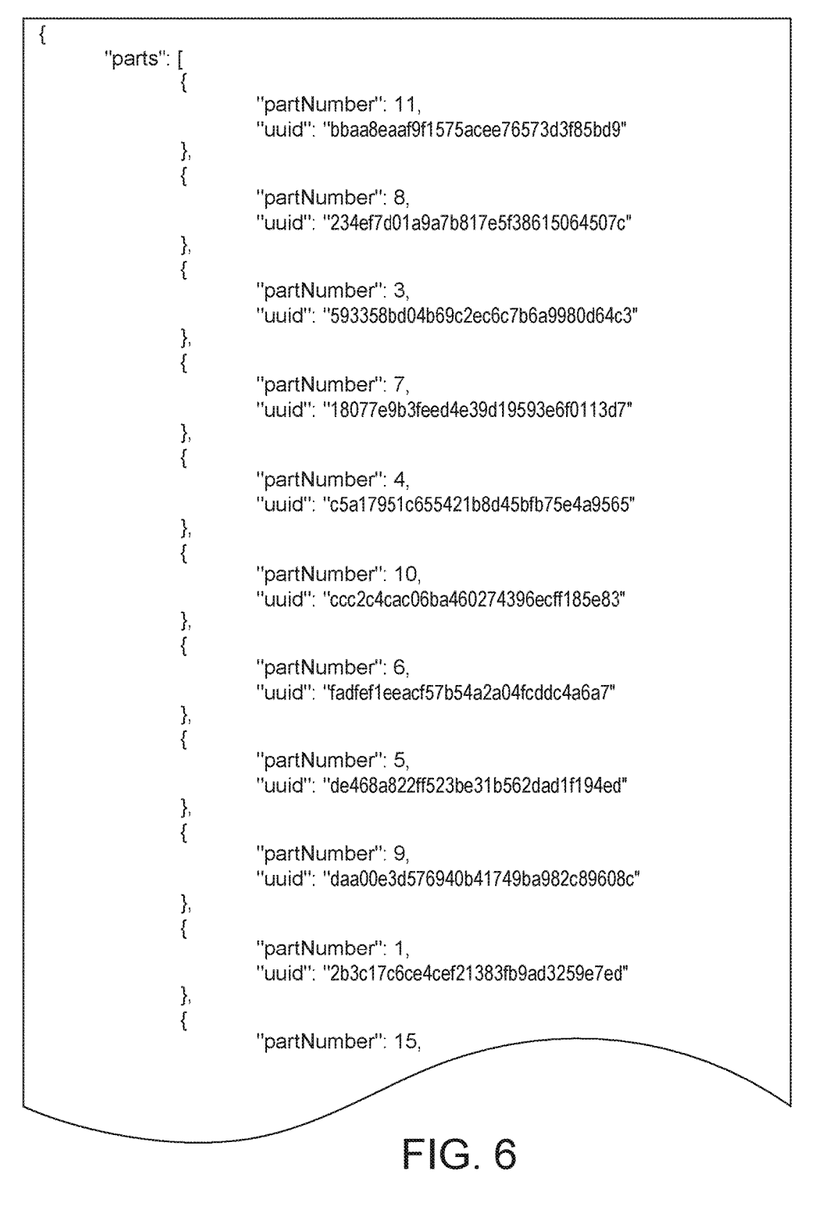
FIG. 6 shows a final order completion manifest.

FIG. 6 shows a final completion manifest using a suitable programming language. The contents of the manifest 600 identify one object part per entry and include: the part identifier 610 (e.g., part number 11), and the unique identifier of the object part 640 (e.g., uuid: bbaa8eaaf9f1575acee76573d3f85bd9). The identifier 640 may be a GUID (Globally Unique Identifier) or other unique identifier such as opaque object names. FIG. 6 is a simple example. In an actual example, there would in fact be hundreds of more identifiers (including 14 and 13) in the final manifest; both FIGS. 1 and 6 are extracts of what the temporary and final manifest look like. In FIG. 6, identifiers 14 and 13 would come next along with any other parts needed.

Other Embodiments

In addition to the invention as claimed below as various methods, the scope of the present invention also includes

Computer System Embodiment

Figure 7A:
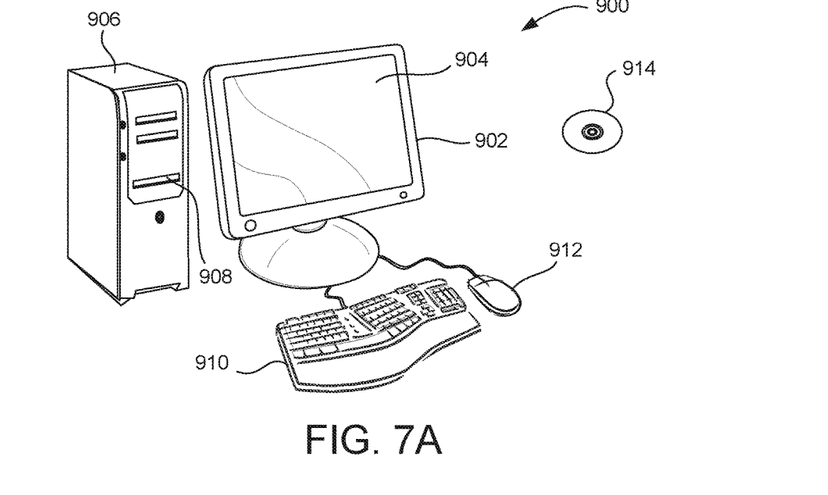
FIGS. 7A and 7B illustrate a computer system suitable for implementing embodiments of the present invention.
Figure 7B:
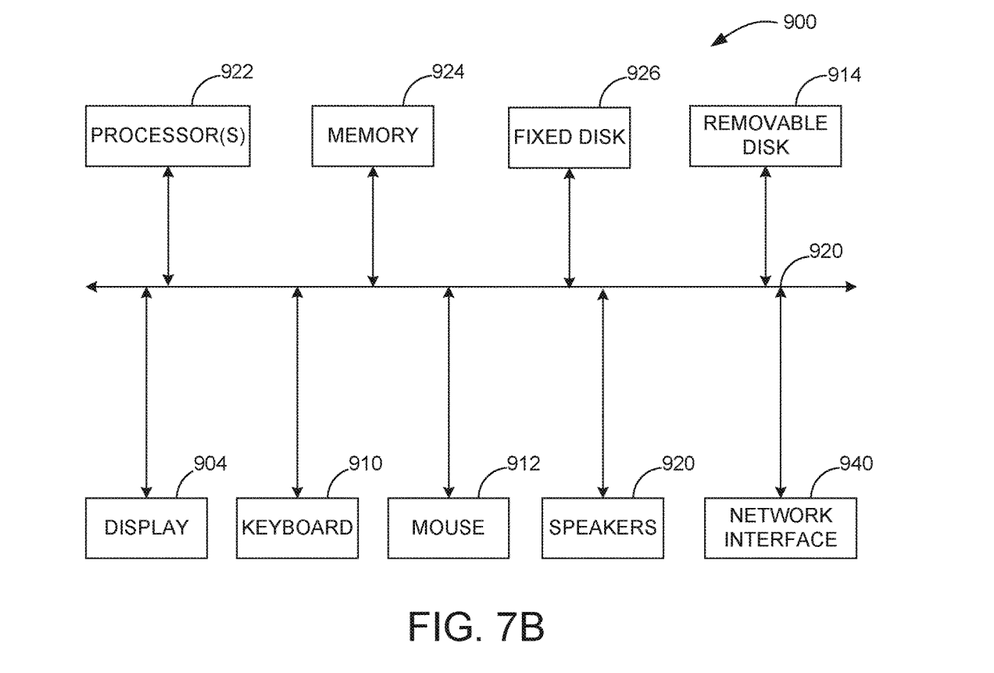

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of writing file data from a client application onto an object storage system, said method comprising:
   a. receiving, at a coupling server on a computer via a file system protocol, a write request from a client application that includes a data block, a start location, a target file name and one of an end location or a size, said coupling server including an associated unique identifier of an object in said object storage system associated with said target file name;
   b. creating a temporary manifest on said computer for said writing that includes an identifier for said data block, said start location, said one of an end location or a size, and a unique identifier for said data block;
   c. temporarily retaining said data block in memory of said computer without storing said data block on locally-accessible storage of said computer;
   d. uploading said data block over an application programming interface (API) to said object storage system and including said unique identifier for said data blocks;
   e. receiving a file close request from said client application for said target file name;
   f. sending said temporary manifest from said coupling server to said object storage system; and
   g. creating a new version of said object identified by said associated unique identifier in said object storage using said temporary manifest and said data block.

2. A method as recited in claim 1 further comprising:
   a. discarding said temporary manifest.

3. A method as recited in claim 1 further comprising:
   performing said writing without retrieving said file from object storage.

4. A method as recited in claim 1 further comprising:
   performing said writing in any byte order sequence.

5. A method as recited in claim 1 further comprising:
   creating an object part that includes said identifier for said object part, said start location, said one of an end location or a size, and said unique identifier for said data block; and
   uploading said object part instead of said data block.

6. A method as recited in claim 1 wherein said API is a representational state transfer (REST) interface.

7. A method of writing a data block from a client application onto an object storage system, said method comprising:
   a. receiving, at a coupling server on a computer via a file system protocol, a write request from a client application that includes a data block of a target file, said coupling server including an associated unique identifier of an object in said object storage system associated with said target file name;
b. creating a temporary manifest on said computer that includes an identifier for said data block, a start location, one of an end location or a size, and a unique identifier for said data block;
c. uploading said data block over an application programming interface (API) to said object storage and including said unique identifier for said data block and said end location or size;
d. receiving a file close request from said client application;
e. creating a final manifest from said temporary manifest that includes a list of all data blocks of said target file in the correct order; and
f. sending said final manifest from said coupling server to said object storage system, wherein said object storage creates a new version of said target file using said final manifest and stores said new version in said object storage as an object identified by said associated unique identifier.

8. A method as recited in claim 7 further comprising:
a. discarding said temporary manifest.

9. A method as recited in claim 7 further comprising:
performing said writing without retrieving said target file from object storage.

10. A method as recited in claim 7 further comprising:
creating said final manifest by reading from said object storage other data blocks of said target file that are not present in said data block.

11. A method as recited in claim 7 further comprising:
creating said final manifest without reading data blocks from said object storage;
reading from said object storage other data blocks of said target file that are not in said data block; and
creating said new version from said data block and from said other data blocks.

12. A method as recited in claim 7 further comprising:
sending an upload completion request from said coupling server to said object storage;
creating a new object version of said target file and replacing an old object version of said file by said object storage.

13. A method as recited in claim 7 wherein said API is a representational state transfer (REST) interface.

14. A method as recited in claim 7 further comprising:
a. retaining said data block in memory of said computer without storing said data block on locally-accessible storage of said computer.

15. A method of writing a data block from a client application onto an object storage system, said method comprising:
receiving, at a coupling server on a computer via a file system protocol, a write request from a client application;
receiving a write request with a data block over an application programming interface (API) at said object storage system from said coupling server, said data block being an update to a target file stored within said object storage system, said coupling server including an associated unique identifier of an object in said object storage system associated with said target file;
receiving a completion request at said object storage system from said coupling server for said target file;
receiving a final manifest at said object storage system from said coupling server, said final manifest including for each data block of said target file an identifier for said data block and a size, said manifest having said data blocks ordered by positions in said target file; and
assembling of new version of said target file by said object storage system using said final manifest, said received data block and said data blocks of said target file listed in said final manifest, and writing said new version into said object storage system as an object identified by said associated unique identifier.

16. A method as recited in claim 15 further comprising:
sending all data blocks of said target file other than said received data block to said coupling server; and
receiving along with said final manifest said all data blocks.

17. A method as recited in claim 15 further comprising:
receiving from said coupling server, a list of all data blocks of said target file other than said received data block; and
retrieving said all data blocks from a current version of said target file in said object storage.

18. A method as recited in claim 15 further comprising:
performing said writing by said object storage without storing said data block on locally-accessible storage of a computer of said coupling server.

19. A method as recited in claim 15 further comprising:
performing said writing without retrieving said entire target file from said object storage.

20. A method as recited in claim 15 wherein said API is a representational state transfer (REST) interface.

* * * * *